United States Patent [19]
Kim

[11] Patent Number: 5,920,422
[45] Date of Patent: Jul. 6, 1999

[54] METHOD FOR MANUFACTURING AN ACTUATED MIRROR ARRAY HAVING AN OPTIMUM OPTICAL EFFICIENCY

[75] Inventor: Jong-Sam Kim, Seoul, Rep. of Korea

[73] Assignee: Daewoo Electronics Co., Ltd., Seoul, Rep. of Korea

[21] Appl. No.: 08/767,005

[22] Filed: Dec. 17, 1996

[30] Foreign Application Priority Data

Dec. 19, 1995 [KR] Rep. of Korea ...................... 95-52085

[51] Int. Cl.$^6$ .......................... G02B 26/00; G02B 26/08; G02B 5/08
[52] U.S. Cl. .......................... 359/295; 359/291; 359/221; 359/846; 359/855; 310/328; 310/366
[58] Field of Search .................................. 359/295, 850, 359/855, 224, 900, 291, 221, 846; 310/311, 328, 365, 366; 29/25.35

Primary Examiner—Ponnathapura Achutamurthy
Assistant Examiner—P. Ponnaluri
Attorney, Agent, or Firm—Pennie & Edmonds LLP

[57] ABSTRACT

A method for manufacturing an array of thin film actuated mirrors capable of ensuring an optimum optical efficiency is disclosed. The method includes the steps of: forming a thin film sacrificial layer on top of an active matrix; forming an array of semifinished actuating structures on top of the thin film sacrificial layer, wherein each of the semifinished actuating structures includes a thin film electrodisplacive member, a second thin film electrode and an elastic member; forming selectively a polymer layer; depositing a first thin film layer on top of each of the semifinished actuating structures; removing the polymer layer, thereby forming an array of actuating structures, each of the actuating structures having a first thin film electrode and the semifinished actuating structure; and removing the thin film sacrificial layer, thereby forming the array of thin film actuated mirrors. Since the formation of the array of semifinished actuating structures is followed by the formation of the first thin film electrode, it may prevent the first thin film electrode, which also functions as a mirror, from chemically or physically damaged during the formation of the array of semifinished actuating structures, thereby ensuring the optical efficiency of the array of thin film actuated mirrors.

6 Claims, 6 Drawing Sheets

METHOD FOR MANUFACTURING AN ACTUATED MIRROR ARRAY HAVING AN OPTIMUM OPTICAL EFFICIENCY

FIELD OF THE INVENTION

The present invention relates to an optical projection system; and, more particularly, to an improved method for the manufacture of an array of M×N thin film actuated mirrors having an optimum optical efficiency for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1F, there are illustrated manufacturing steps involved in manufacturing an array 100 of M×N thin film actuated mirrors 101, wherein M and N are integers, disclosed in a copending commonly owned application, U.S. Ser. No. 08/598,478, now U.S. Pat. No. 5,677,785, entitled "METHOD FOR FORMING AN ARRAY OF THIN FILM ACTUATED MIRRORS".

The process for the manufacture of the array 100 begins with the preparation of an active matrix 10 including a substrate 12 with an array of M×N connecting terminals 14 and an array of M×N transistors (not shown), wherein each of the connecting terminals 14 is electrically connected to a corresponding transistor in the array of transistors.

In a subsequent step, there is deposited on top of the active matrix 10 a thin film sacrificial layer 20, having a thickness of 0.1–2 μm, and made of a metal, e.g., copper (Cu) or nickel (Ni), a phosphor-silicate glass (PSG) or a poly-Si. The thin film sacrificial layer 20 is deposited by using a sputtering or an evaporation method if the thin film sacrificial layer 20 is made of a metal, a chemical vapor deposition (CVD) method or a spin coating method if the thin film sacrificial layer 20 is made of a PSG, or a CVD method if the thin film sacrificial layer 20 is made of a poly-Si.

Thereafter, there is formed an array of M×N pairs of empty cavities (not shown) on the thin film sacrificial layer 20 by using an etching method, as shown in FIG. 1A. One of the empty cavities in each pair encompasses one of the connecting terminals 14.

Subsequently, an elastic layer 30, made of an insulating material, and having a thickness of 0.1–2 μm, is deposited on top of the thin film sacrificial layer 20 including the empty cavities by using a CVD method.

In a next step, there is created an array of M×N contact holes 37 on the elastic layer 30 by using an etching method, wherein each of the contact holes 37 exposes one top of the connecting terminals 14 and has inner surfaces (not shown), as shown in FIG. 1B.

Then, a second thin film layer 40, made of an electrically conducting material, and having a thickness of 0.1–2 μm, is deposited on top of the elastic layer 30 including the inner surfaces of each of the contact holes 37 by using a sputtering or a vacuum evaporation method.

Next, a thin film electrodisplacive layer 50, made of a piezoelectric or an electrostrictive material, and having a thickness of 0.1–2 μm, is deposited on top of the second thin film layer 40 by using a CVD method, an evaporation method, a Sol-Gel method or a sputtering method. The thin film electrodisplacive layer 50 is then heat treated to allow a phase transition to take place, as shown in FIG. 1C.

In an ensuing step, a first thin film layer 60, made of an electrically conducting and light reflecting material, and having a thickness of 0.1–2 μm, is deposited on top of the thin film electrodisplacive layer 50 by using a sputtering or a vacuum evaporation method, as shown in FIG. 1D.

After the above step, the first thin film 60, the thin film electrodisplacive 50, the second thin film 40 and the elastic layers 30 are, respectively, patterned, until top of the thin film sacrificial layer 20 is exposed, by using an etching method, e.g., a photolithography or a laser trimming method, thereby forming an array of M×N actuating structures 90, each of the actuating structures 90 having a first thin film electrode 65, a thin film electrodisplacive member 55, a second thin film electrode 45 and an elastic member 35, as shown in FIG. 1E. Each of the second thin film electrodes 45 is electrically connected to a corresponding connecting terminal 14, thereby functioning as a signal electrode in each of the actuating structures 90. Each of the first thin film electrodes 65 is electrically connected to ground, thereby functioning as a mirror as well as a common bias electrode in each of the actuating structures 90.

Since each of the thin film electrodisplacive members 55 is sufficiently thin, there is no need to pole it in case it is made of a piezoelectric material: for it can be poled with the electric signal applied during the operation of the thin film actuated mirrors 101.

The preceeding step is then followed by completely covering each of the actuating structures 90 with a thin film protection layer (not shown).

The thin film sacrificial layer 20 is then removed by using an etching method. Finally, the thin film protection layer is removed, thereby forming the array 100 of M×N thin film actuated mirrors 101, as shown in FIG. 1F.

There are a number of shortcomings associated with the above described method for manufacturing the array 100 of M×N thin film actuated mirrors 101. One of the shortcomings is the overall optical efficiency of the array 100 thus prepared. Since the deposition and the patterning of the first thin film layer 60 for forming the first thin film electrode 65 are followed by the patternings of the thin film electrodisplacive 50, the second thin film 40 and the elastic layers 30 by using an etching method, the first thin film electrode 65, which is located at top layer and also functions as a mirror, in each of the actuating structures 90 is chemically or physically affected during the patternings thereof, which may adversely affect the optical efficiency of the array 100 of thin film actuated mirrors 101.

SUMMARY OF THE INVENTION

It is, therefore, a primary object of the present invention to provide a method for the manufacture of an array of M×N thin film actuated mirrors for use in an optical projection system, the method capable of ensuring an optimum optical efficiency in the array.

In accordance with one aspect of the present invention, there is provided a method for the manufacture of an array of M×N thin film actuated mirrors, wherein M and N are integers, for use in an optical projection system, the method comprising the steps of: forming a thin film sacrificial layer on top of an active matrix; forming an array of M×N semifinished actuating structures on top of the thin film sacrificial layer, each of the semifinished actuating structures being regularly spaced apart by exposed portions of the thin film sacrificial layer therebetween, each of the semifinished actuating structures having a thin film electrodisplacive member, a second thin film electrode and an elastic member; forming a polymer layer on side surfaces of each of the semifinished actuating structures including the exposed portions of the thin film sacrificial layer; depositing a first thin film layer on top of each of the semifinished actuating structures; removing the polymer layer, thereby forming an array of M×N actuating structures, wherein each of the actuating structures includes a first thin film electrode formed on top of each of the semifinished actuating structures; and removing the thin film sacrificial layer, thereby forming the array of M×N thin film actuated mirrors.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 1A:
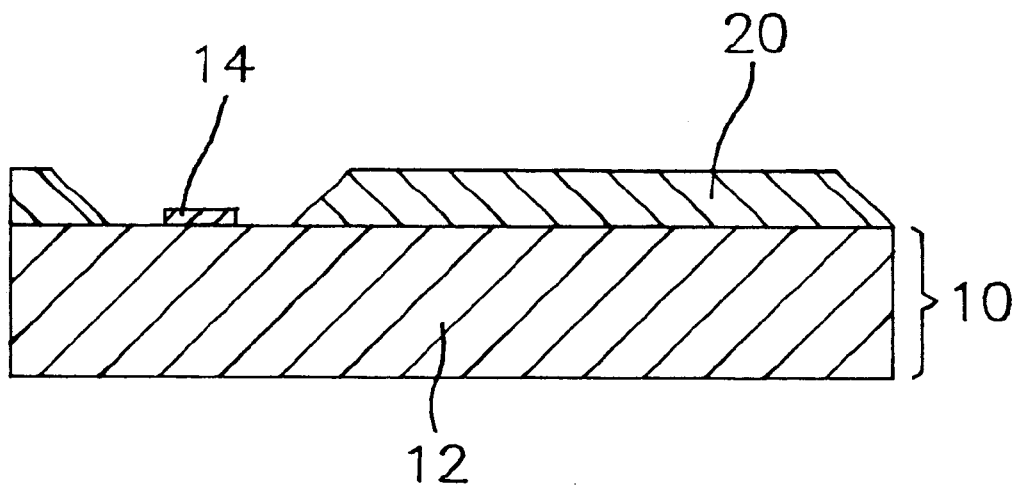
FIGS. 1A to 1F present schematic cross sectional views illustrating a method for the manufacture of an array of M×N thin film actuated mirrors previously disclosed.
Figure 1B:
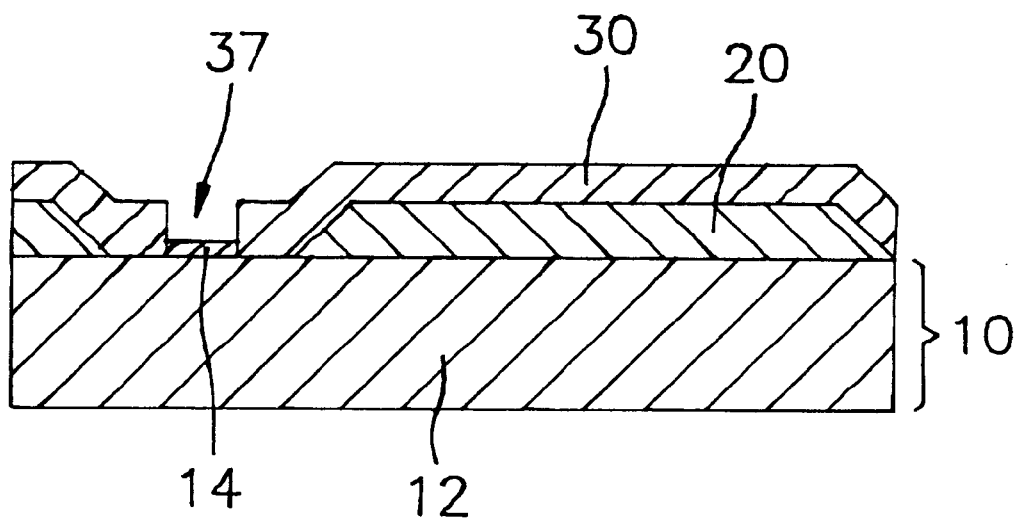
Figure 1C:
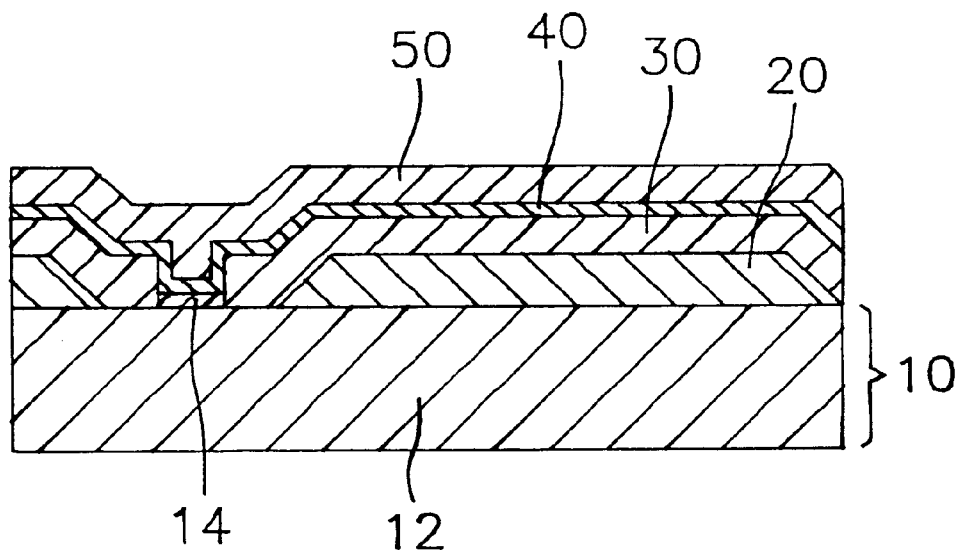
Figure 1D:
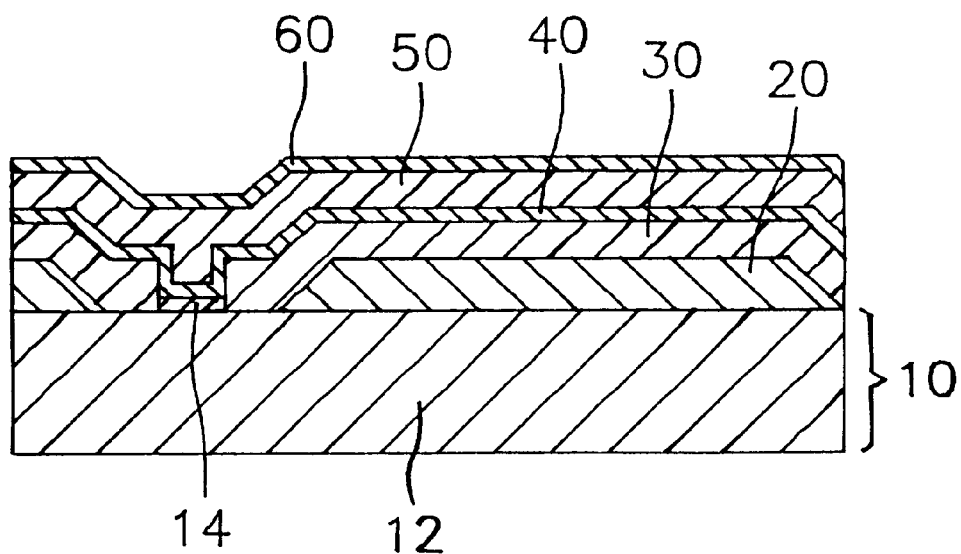
Figure 1E:
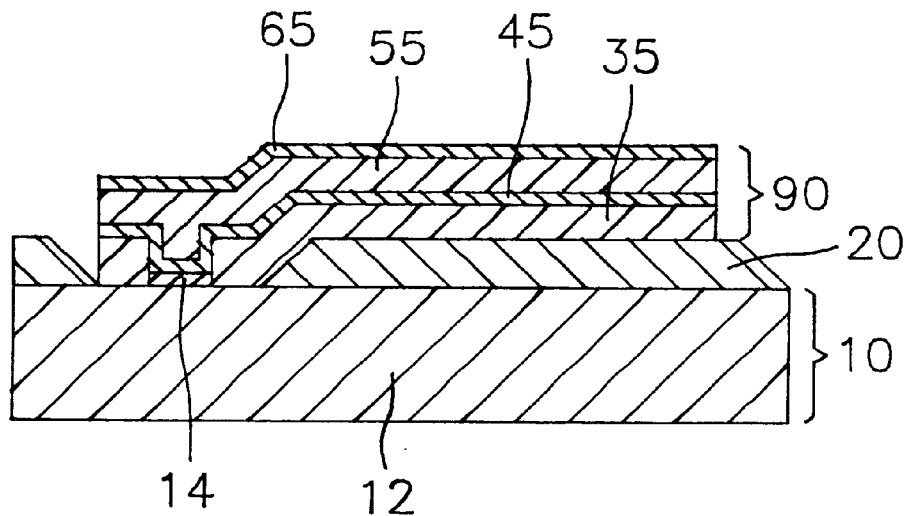
Figure 1F:
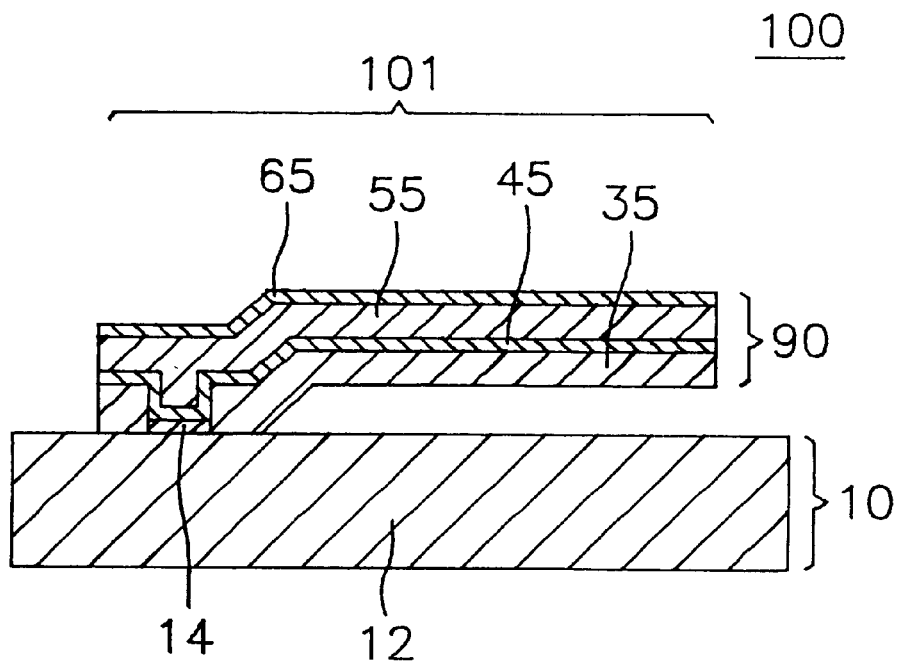

There are provided in FIGS. 2A to 2F schematic cross sectional views setting forth a method for the manufacture of an array 300 of M×N thin film actuated mirrors 301, wherein M and N are integers, for use in an optical projection system, in accordance with the present invention. It should be noted that like parts appearing in FIGS. 2A to 2F are represented by like reference numerals.

The process for the manufacture of the array 300 begins with the preparation of an active matrix 210 including a substrate 212 with an array of M×N connecting terminals 214 formed on top of the substrate 212 and an array of M×N transistors (not shown), wherein each of the connecting terminals 214 is electrically connected to a corresponding transistor in the array of transistors.

In a subsequent step, there is deposited on top of the active matrix 210 a thin film sacrificial layer 220, having a thickness of 0.1–2 μm, and made of a metal, e.g., copper (Cu) or nickel (Ni), a phosphor-silicate glass (PSG) or a poly-Si. The thin film sacrificial layer 220 is deposited by using a sputtering or an evaporation method if the thin film sacrificial layer 220 is made of a metal, a chemical vapor deposition (CVD) method or a spin coating method if the thin film sacrificial layer 220 is made of a PSG, or a CVD method if the thin film sacrificial layer 220 is made of a poly-Si.

Figure 2A:
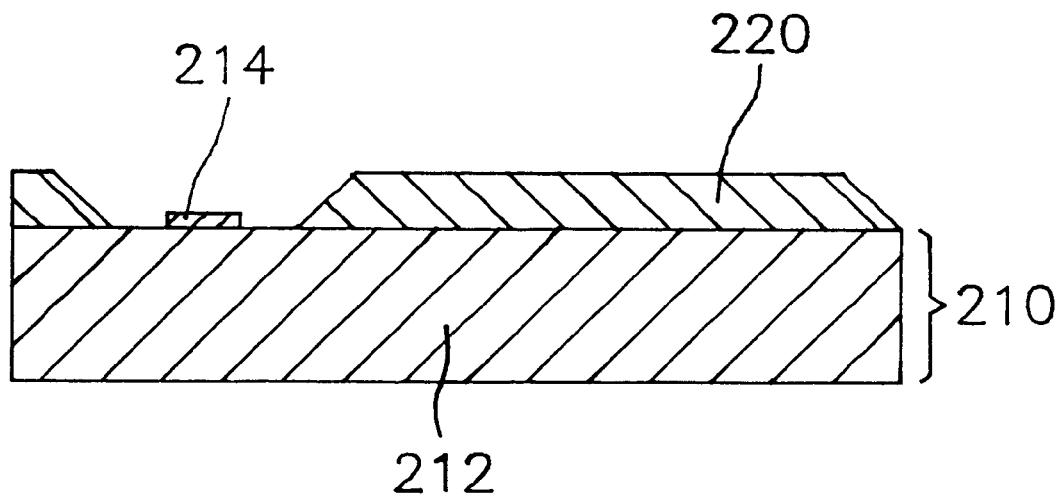
FIGS. 2A to 2F provide schematic cross sectional views setting forth a method for the manufacture of an array of M×N thin film actuated mirrors in accordance with the present invention.

Thereafter, there is formed an array of M×N pairs of empty cavities (not shown) on the thin film sacrificial layer 220 by using an etching method, as shown in FIG. 2A. Each of the empty cavities in each pair encompasses one of the connecting terminals 214.

Subsequently, an elastic layer 230, made of an insulating material, e.g., silicon nitride, and having a thickness of 0.1–2 μm, is deposited on top of the thin film sacrificial layer 220 including the empty cavities by using a chemical vapor deposition (CVD) method.

Figure 2B:
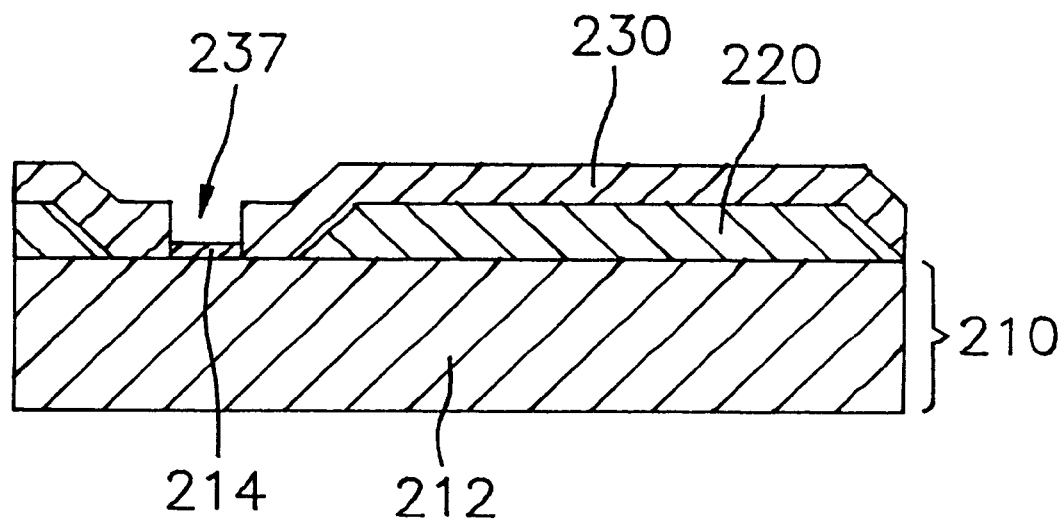

In an ensuing step, there is created an array of M×N contact holes 237 on the elastic layer 230 by using an etching method, as shown in FIG. 2B, wherein each of the contact holes 237 exposes one of the connecting terminals 214.

Then, a second thin film layer 240, made of an electrically conducting material, e.g., Pt/Ta, and having a thickness of 0.1–2 μm, is deposited on top of the elastic layer 230 including inner surfaces of each of the contact holes 237 by using a sputtering or a vacuum evaporation method.

Figure 2C:
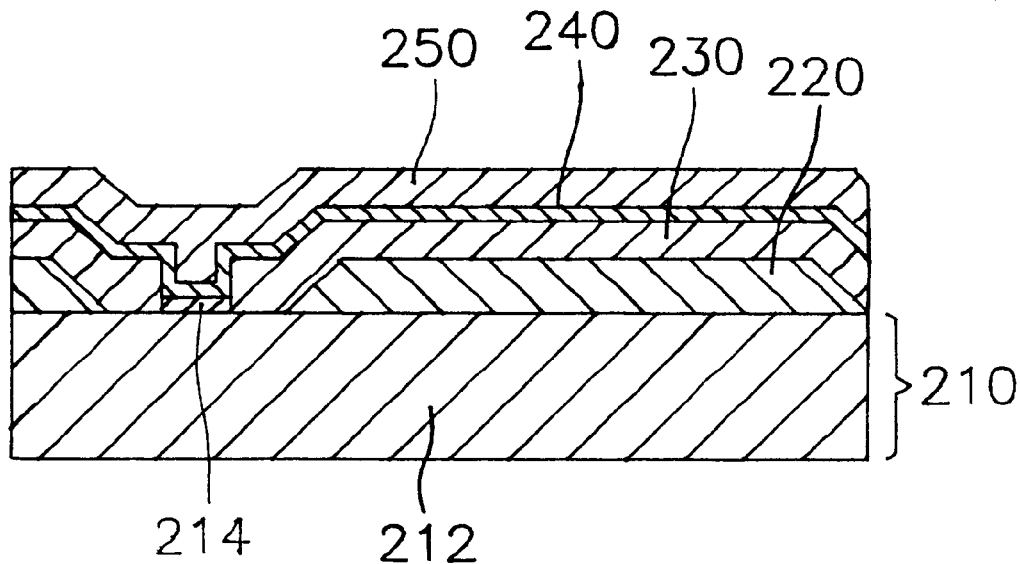

Next, a thin film electrodisplacive layer 250, made of a piezoelectric material, e.g., PZT, or an electrostrictive material, e.g., PMN, and having a thickness of 0.1–2 μm, is deposited on top of the second thin film layer 240 by using a CVD method, an evaporation method, a Sol-Gel method or a sputtering method. The thin film electrodisplacive layer 250 is then heat treated to allow a phase transition to take place, as shown in FIG. 2C.

Figure 2D:
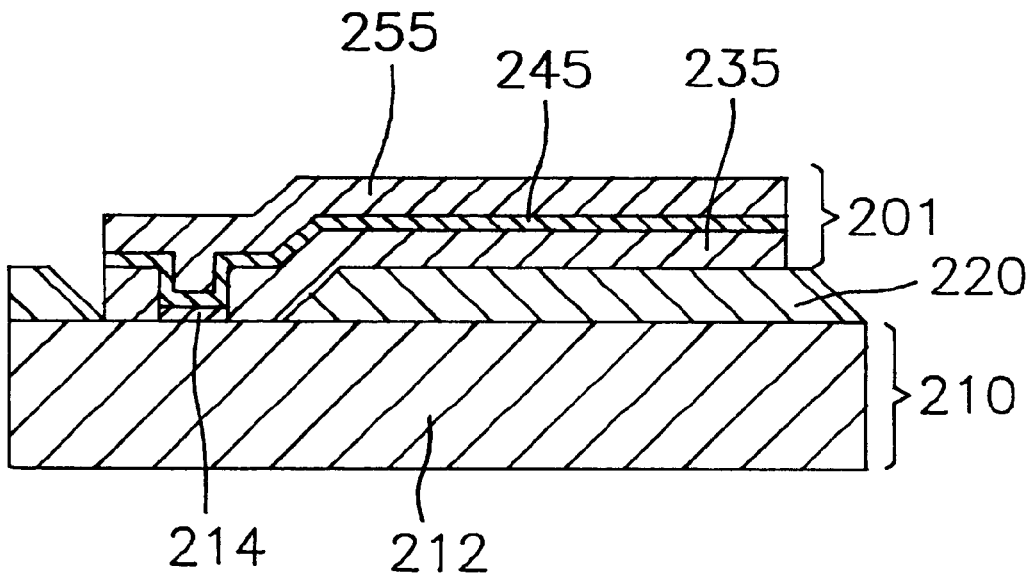

In a next step, the thin film electrodisplacive 250, the second thin film 240 and the elastic layers 230 are, respectively, patterned, until a top portion of the thin film sacrificial layer 220 is exposed, by using an etching method, e.g., a photolithography or a laser trimming method, thereby forming an array of M×N semifinished actuating structures 201, wherein each of the semifinished actuating structures 201 has a thin film electrodisplacive member 255, a second thin film electrode 245 and an elastic member 235, as shown in FIG. 2D.

Since each of the thin film electrodisplacive members 255 is sufficiently thin, there is no need to pole it in case it is made of a piezoelectric material: for it can be poled with the electric signal applied during the operation of the thin film actuated mirrors 301.

Figure 2E:
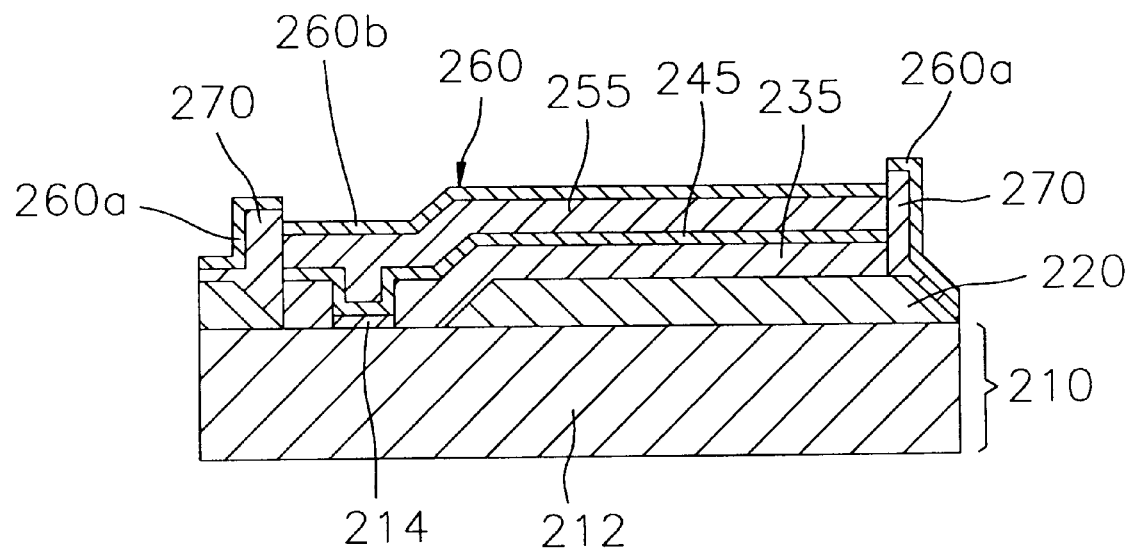

In a subsequent step, a first thin film electrode 265 is formed on top of each of the semifinished actuating structures 201 by using a lift-off method, the lift off method for forming the first thin film electrode 265 including the steps of: forming a polymer layer 270 made of a photoresist on side surfaces of each of the semifinished actuating structures 201 including the exposed top portion of the thin film sacrificial layer 220; depositing a first thin film layer 260, made of an electrically conducting and light reflecting material, e.g., aluminum (Al) or silver (Ag), and having a thickness of 0.1–2 μm, on top of each of the semifinished actuating structures 201 including top of the polymer layer 270, as shown in FIG. 2E, by using a sputtering or a vacuum evaporation method; and removing the polymer layer 270 including first portions 260a of the first thin film layer 260 deposited on top thereof by using an etching method, thereby leaving second portion 260b of the first thin film layer 260 and thus forming an array of M×N actuating structures 200. Each of the actuating structures 200 includes the first thin film electrode 265, the thin film electrodisplacive member 255, the second thin film electrode 245 and the elastic member 235. Each of the second thin film electrodes 245 is electrically connected to a corresponding connecting terminal 214, thereby functioning as a signal electrode in each of the actuating structures 200. Each of the first thin film electrodes 265 is electrically connected to ground, thereby functioning as a mirror as well as a common bias electrode in each of the actuating structures 200.

Figure 2F:
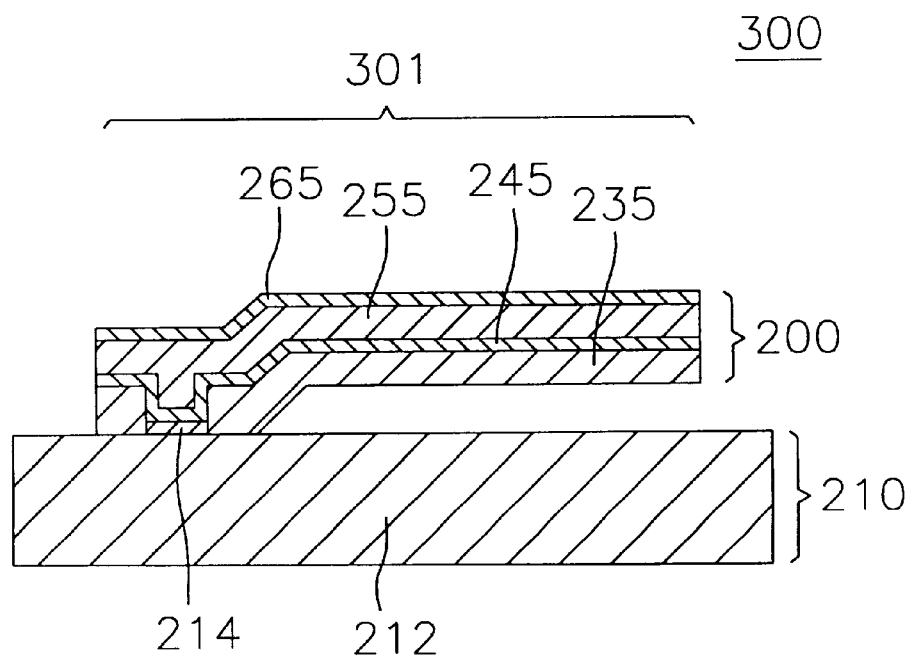

Finally, the thin film sacrificial layer 220 is removed, thereby forming the array 300 of M×N thin film actuated mirrors 301, as shown in FIG. 2F.

In contrast with the method for the manufacture of the array 100 of M×N thin film actuated mirrors 101 previously disclosed, wherein the deposition and the patterning of the first thin film layer 60 are followed by the patternings of the thin film electrodisplacive 50, the second thin film 40 and the elastic layers 30, in the inventive method, since the patterning of the thin film electrodisplacive 250, the second thin film 240 and the elastic layers 230 is followed by the formation of the first thin film electrode 265, it may prevent the first thin film electrode 265, which also functions as a mirror, from chemically or physically damaged during the patterning, which will, in turn, ensure an optical efficiency in the array 300 of M×N thin film actuated mirrors 301.

While the present invention has been described with respect to certain preferred embodiments only, other modifications and variations may be made without departing from the scope of the present invention as set forth in the following claims.

What is claimed is:

1. A method for the manufacture of an array of thin film actuated mirrors, the method comprising the steps of:

forming a thin film sacrificial layer on top of an active matrix;

forming an array of M×N semifinished actuating structures on top of the thin film sacrificial layer, each of the semifinished actuating structures being regularly spaced apart by exposed portions of the thin film sacrificial layer therebetween, each of the semifinished actuating structures having a thin film electrodisplacive member, a second thin film electrode and an elastic member;

forming a polymer layer only on side surfaces of each of the semifinished actuating structures including the exposed portions of the thin film sacrificial layer;

depositing a first thin film layer on top of each of the semifinished actuating structures;

removing the polymer layer, thereby forming an array of M×N actuating structures, wherein each of the actuating structures includes a first thin film electrode formed on top of each of the semifinished actuating structures; and removing the thin film sacrificial layer, thereby forming the array of M×N thin film actuated mirrors.

2. The method of claim 1, wherein the polymer layer is made of a photoresist.

3. A method for the manufacture of an array of thin film actuated mirrors, the method comprising the steps of:

forming a thin film sacrificial layer on top of an active matrix;

forming an array of M×N semifinished actuating structures on top of the thin film sacrificial layer, each of the semifinished actuating structures being regularly spaced apart by exposed portions of the thin film sacrificial layer therebetween, each of the semifinished actuating structures having a thin film electrodisplacive member, a second thin film electrode and an elastic member;

forming a polymer layer on side surfaces of each of the semifinished actuating structures including the exposed portions of the thin film sacrificial layer;

depositing a first thin film layer on top of each of the semifinished actuating structures, removing the polymer layer, thereby forming an array of M×N actuating structures, wherein each of the actuating structures includes a first thin film electrode formed on top of each of the semifinished actuating structures: and removing the thin film sacrificial layer, thereby forming the array of M×N thin film actuated mirrors, wherein first portions of the first thin film layer are deposited on top of the polymer layer and a second portion of the first thin film layer is deposited on top of each of the semifinished actuating structures.

4. The method of claim 3, wherein the first portions of the first thin film layer deposited on top of the polymer layer are removed together with the polymer layer.

5. A method for the manufacture of an array of thin film actuated mirrors, the method comprising the steps of:

forming a thin film sacrificial layer on top of an active matrix;

forming an array of M×N semifinished actuating structures on top of the thin film sacrificial layer, each of the semifinished actuating structures being regularly spaced apart by exposed portions of the thin film sacrificial layer therebetween, each of the semifinished actuating structures having a thin film electrodisplacive member, a second thin film electrode and an elastic member;

forming a polymer layer on side surfaces of each of the semifinished actuating structures including the exposed portions of the thin film sacrificial layer;

depositing a first thin film layer, said first thin film layer comprising a first portion covering the polymer layer and a second portion covering the semifinished actuating structures;

removing the polymer layer along with said first portion of the first thin film layer, thereby forming an array of M×N actuating structures, wherein each of the actuating structures includes a first thin film electrode formed on top of each of the semifinished actuating structures;

and removing the thin film sacrificial layer, thereby forming the array of M×N thin film actuated mirrors.

6. The method of claim 5, wherein the polymer layer is made of a photoresist.

* * * * *